(12) United States Patent
Gaknoki et al.

(10) Patent No.: US 8,717,785 B2
(45) Date of Patent: May 6, 2014

(54) MULTI-STAGE SAMPLING CIRCUIT FOR A POWER CONVERTER CONTROLLER

(75) Inventors: Yury Gaknoki, San Jose, CA (US);
Mingming Mao, Saratoga, CA (US);
Michael Yue Zhang, Mountain View, CA (US)

(73) Assignee: Power Integrations, Inc., San Jose, CA (US)

( * ) Notice: Subject to any disclaimer, the term of this patent is extended or adjusted under 35 U.S.C. 154(b) by 130 days.

(21) Appl. No.: 13/250,183

(22) Filed: Sep. 30, 2011

(65) Prior Publication Data
US 2013/0083566 A1 Apr. 4, 2013

(51) Int. Cl.
*H02M 3/335* (2006.01)
*G05F 1/00* (2006.01)

(52) U.S. Cl.
USPC .......................................... 363/21.13; 323/283

(58) Field of Classification Search
USPC .......... 363/21.04, 21.05, 21.07, 21.08, 21.09, 363/21.1, 21.11, 21.12, 21.13, 21.15, 21.16, 363/21.17, 21.18; 323/282, 283, 284, 285, 323/288
See application file for complete search history.

(56) References Cited

U.S. PATENT DOCUMENTS

| | | | | |
|---|---|---|---|---|
| 6,958,920 | B2 * | 10/2005 | Mednik et al. | 323/285 |
| 7,054,170 | B2 * | 5/2006 | Yang et al. | 363/21.18 |
| 7,463,497 | B2 * | 12/2008 | Negrete | 363/21.13 |
| 7,486,528 | B2 * | 2/2009 | Yang | 363/21.12 |
| 7,701,734 | B2 | 4/2010 | Li et al. | |
| 7,710,084 | B1 * | 5/2010 | Guo | 323/224 |
| 8,164,928 | B2 * | 4/2012 | Lin et al. | 363/21.16 |
| 8,477,516 | B2 * | 7/2013 | Chien et al. | 363/21.16 |
| 2008/0246456 | A1 * | 10/2008 | Djenguerian et al. | 323/302 |
| 2009/0141520 | A1 * | 6/2009 | Grande et al. | 363/21.16 |
| 2010/0097104 | A1 * | 4/2010 | Yang et al. | 327/103 |
| 2010/0289463 | A1 | 11/2010 | Wang et al. | |
| 2010/0321956 | A1 * | 12/2010 | Yeh | 363/16 |
| 2011/0141774 | A1 * | 6/2011 | Kane et al. | 363/37 |
| 2011/0261596 | A1 * | 10/2011 | Zong et al. | 363/21.13 |

OTHER PUBLICATIONS

KR 10-2012-107799—First Korean Office Action, dated Nov. 19, 2013, with English Translation (7 pages).

* cited by examiner

*Primary Examiner* — Gary L Laxton
*Assistant Examiner* — Alex Torres-Rivera
(74) *Attorney, Agent, or Firm* — Blakely Sokoloff Taylor & Zafman LLP

(57) ABSTRACT

An example controller for a power converter includes a track and hold circuit, a sample and hold circuit, and drive logic. The track and hold circuit receives a signal from a terminal of the controller that is representative of an output voltage of the power converter. The track and hold circuit includes a first capacitor that provides a first voltage that tracks the signal and then holds the first voltage. The sample and hold circuit samples the first voltage when the first voltage is held on the first capacitor. The sample and hold circuit includes a second capacitor coupled to hold a second voltage representative of the first voltage after a sample period, where the second capacitor has a capacitance value larger than that of the first capacitor. The drive logic controls the first switch to regulate an output of the power converter in response to the second voltage.

19 Claims, 4 Drawing Sheets

MULTI-STAGE SAMPLING CIRCUIT FOR A POWER CONVERTER CONTROLLER

BACKGROUND INFORMATION

1. Field of the Disclosure

The present invention relates generally to power converter controllers, and more specifically, the invention relates to sampling circuits for power converter controllers.

2. Background

Many electrical devices such as cell phones, personal digital assistants (PDA's), laptops, etc. utilize power to operate. Because power is generally delivered through a wall socket as high voltage alternating current (ac), a device, typically referred to as a power converter can be utilized to transform the high voltage alternating current (ac) input to a well regulated direct current (dc) output through an energy transfer element. Switched mode power converters are commonly used due to their high efficiency, small size and low weight to power many of today's electronics. In operation, a switch is utilized to provide the desired output quantity by varying the duty cycle (typically the ratio of the on-time of the switch to the total switching period), varying the switching frequency or varying the number of pulses per unit time of the switch in a power converter.

A power converter may use a controller to provide output regulation to an electrical device (generally referred to as a load) by sensing and controlling the output of the power converter in a closed loop. More specifically, the controller may be coupled to a sensor that provides feedback information about the output of the power converter in order to regulate the output quantity delivered to the load. The controller regulates the output quantity delivered to the load by controlling a switch to turn on and off in response to the feedback information from the sensor to transfer energy pulses to the power converter output from a source of input power such as a power line.

The sensor used in the power converter to provide the feedback information may include an optocoupler that receives information about the output voltage directly from the output of the power converter. The output of the power converter is also coupled to a secondary winding of the energy transfer element. This type of control scheme is typically referred to as "secondary-side control." Another type of control scheme, commonly referred to as "primary-side control," may alternatively be utilized by the controller. In primary-side control, the sensor may include a primary-referenced winding (e.g., a bias winding) of the energy transfer element to provide a signal representative of the output voltage of the power converter immediately after a switching event that delivers energy to the output. Although primary-side control eliminates the cost and the power consumed by an optocoupler, the output voltage cannot be sensed in the absence of switching. In addition, there is a limited amount of time that the signal provided by the primary-referenced winding is representative of the output voltage, especially during light-load conditions.

BRIEF DESCRIPTION OF THE DRAWINGS

Non-limiting and non-exhaustive examples of the present invention are described with reference to the following figures, wherein like reference numerals refer to like parts throughout the various views unless otherwise specified.

DETAILED DESCRIPTION

Figure 1:
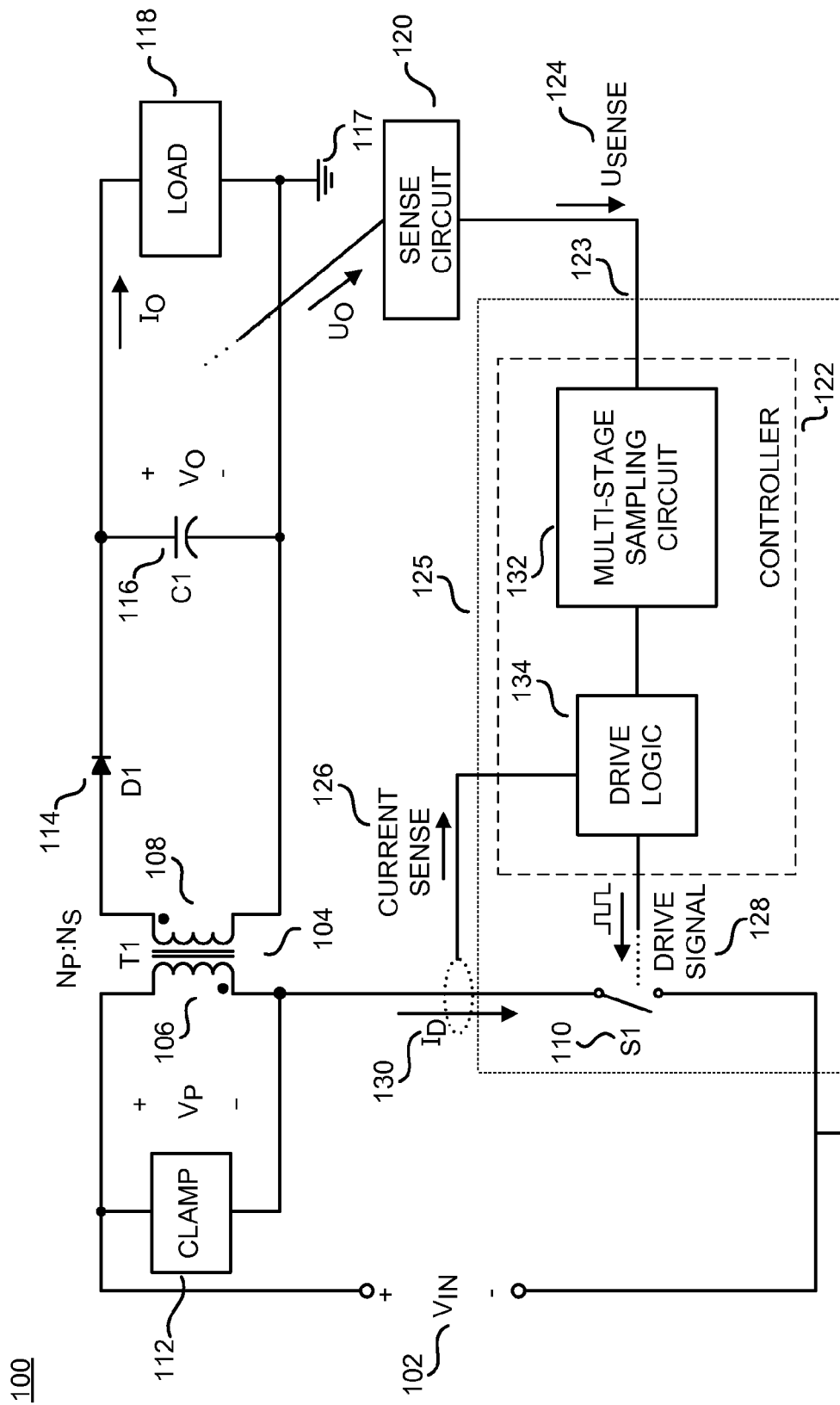
FIG. 1 is a functional block diagram illustrating an example power converter including a controller, in accordance with the teachings of the present invention.

Examples related to sensing voltages in power converters are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, example integrated controllers for power converters provide output regulation by sensing and controlling the output of the power converter in a closed loop. A sense circuit included in the power converter may rely on a magnetic coupling between isolated windings of an energy transfer element to provide a signal representative of the output voltage. As mention previously, this type of control is often referred to as "primary-side control" or control using primary-side feedback.

Although primary-side feedback eliminates the cost and the power consumed by an optocoupler, the output voltage cannot be sensed in the absence of switching. Thus, example controllers in accordance with the teachings herein include a sampling circuit to sample the signal provided by the sense circuit. In one example, the sampling circuit includes a capacitor to store the sampled signal. The sensed signal stored on the capacitor is then later received by drive logic of the controller to control the power switch. However, there is a limited amount of time that the signal provided by the sense circuit is representative of the output voltage, especially during light-load conditions.

In addition, for a controller which utilizes pulse skipping at light loads, the capacitor which stores the sensed signal should be large enough to hold the value of the sensed signal for several clock cycles. As will be further discussed, the controller includes an oscillator which provides a clock signal. The frequency of the clock signal may partially determine the switching frequency of the switch. Under certain operating conditions, the switch is enabled during every clock cycle and as such the switching frequency is substantially equal to the clock frequency. However, during light load conditions, the switch is not enabled at every clock cycle and the effective switching frequency is lower than the clock frequency. As such, the capacitor which stores the sensed signal should be large enough to hold the value of the sensed signal for several clock cycles until at least the next switching event.

Thus, to charge a single large capacitor to store the sensed output voltage in a small amount of time may require the use of fast, high current buffers which utilize more power and are complicated to design. Accordingly, embodiments of the present invention utilize a multi-stage sampling circuit to sense and store the signal provided by the sense circuit. In one example, the multi-stage sampling circuit includes a track and hold stage followed by a sample and hold stage to sense and store the output voltage of a power converter. A track and hold stage is coupled to track the sensed output voltage then hold the sensed output voltage on a small capacitor which is charged using a simple buffer. Once the sensed output voltage is held on the smaller, track and hold capacitor the held value is then transferred to a larger capacitor (e.g., approximately ten times the capacitance) using a sample and hold stage. As such, the multi-stage feedback circuit may quickly hold the sensed output voltage on a small capacitor of the track and hold circuit and then by transferring the sensed output voltage to the larger capacitor of the sample and hold circuit, the controller may hold the value of the sensed output voltage for many clock cycles. In one embodiment, utilizing the track and hold circuit allows the controller to acquire the value of the sensed output voltage at the latest possible moment.

To illustrate, FIG. 1 is a functional block diagram illustrating an example power converter 100 including a controller 122, in accordance with the teachings of the present invention. The illustrated example of power converter 100 includes an energy transfer element T1 104, a primary winding 106 of the energy transfer element T1 104, a secondary winding 108 of the energy transfer element T1 104, a switch S1 110, a input return 111, a clamp circuit 112, a rectifier D1 114, an output capacitor C1 116, an output return 117, a sense circuit 120, controller 122, and integrated circuit 125. Controller 122 is shown as including a single feedback terminal 123, a multi-stage sampling circuit 132 and drive logic 134. Also shown in FIG. 1 are an input voltage VIN 102, an output quantity UO, an output voltage VO, an output current IO, a sense signal USENSE 124, a current sense signal 126, a drive signal 128, and switch current ID 130. In the illustrated example, the power converter 100 is shown as a power converter having a flyback topology for explanation purposes. It is appreciated that other known topologies and configurations of power converter may also benefit from the teachings of the present invention.

The power converter 100 provides output power to a load 118 from an unregulated input VIN 102. In one embodiment the input VIN 102 is a rectified and filtered ac line voltage. In another embodiment, the input voltage VIN 102 is a dc input voltage. The input VIN 102 is coupled to the energy transfer element T1 104. In some embodiments of the present invention the energy transfer element T1 104 may be a coupled inductor. In some other embodiments of the present invention the energy transfer element T1 104 may be transformer. In the example of FIG. 1, the energy transfer element T1 104 includes two windings, a primary winding 106 and secondary winding 108. NP and NS are the number of turns for the primary winding 106 and secondary winding 108, respectively. In the example of FIG. 1, primary winding 108 may be considered an input winding, and secondary winding 112 may be considered an output winding. The primary winding 106 is further coupled to power switch S1 110, which is then further coupled to the input return 111. In addition, the clamp circuit 112 is coupled across the primary winding 106 of the energy transfer element T1 104.

The secondary winding 108 of the energy transfer element T1 104 is coupled to the rectifier D1 114. In the example illustrated in FIG. 1, the rectifier D1 114 is exemplified as a diode and the secondary winding 108 is coupled to the anode of the diode. However, in some embodiments the rectifier D1 114 may be a transistor used as a synchronous rectifier. Both the output capacitor C1 116 and the load 118 are coupled to the rectifier D1 114. In the example of FIG. 1, both the output capacitor C1 116 and the load 118 are coupled to the cathode of the diode. An output is provided to the load 118 and may be provided as either an output voltage VO, output current IO, or a combination of the two.

The power converter 100 further comprises circuitry to regulate the output which is exemplified as output quantity UO. A sense circuit 120 is coupled to sense the output quantity UO and to provide sense signal USENSE 124, which is representative of the output quantity UO. As will be discussed in more detail below, the sense circuit 120 may sense the output quantity from an additional winding of the energy transfer element T1 104. In another embodiment, the sense circuit 120 may sense the output quantity UO directly from the output of the power converter 100 through a circuit such as an optocoupler. In general, the output quantity UO is either an output voltage VO, output current IO, or a combination of the two.

Controller 122 is coupled to the sense circuit 120 and may include several terminals. At terminal 123, the controller 122 receives sense signal USENSE 124 from the sense circuit 120. The controller 122 further includes terminals for receiving the current sense signal 126 and for providing the drive signal 128 to switch S1 110. The current sense signal 126 may be representative of the switch current ID 130 in switch S1 110. In addition, the controller 122 provides drive signal 128 to the switch S1 110 to control various switching parameters. Examples of such parameters may include switching frequency, switching period, duty cycle, or respective on and off times of the switch S1 110.

As illustrated in FIG. 1, the controller 122 includes multi-stage sampling circuit 132 and drive logic 134. The multi-stage sampling circuit 132 is coupled to receive the sense signal USENSE 124. Output of the multi-stage sampling circuit is then coupled to and received by drive logic 134. Drive logic 134 further receives current sense signal 126 and outputs drive signal 128 in response to the output of the multi-stage sampling circuit. In some embodiments, the drive logic 134 also outputs drive signal 128 in response to the current sense signal 126.

In the example of FIG. 1, input voltage VIN 102 is positive with respect to input return 111, and output voltage VO 120 is positive with respect to output return 117. The example of FIG. 1 shows galvanic isolation between the input return 111 and the output return 117. In other words, a dc voltage applied between input return 111 and output return 117 will produce substantially zero current. Therefore, circuits electrically coupled to the primary winding 106 are galvanically isolated from circuits electrically coupled to the secondary winding 108.

In operation, the power converter 100 of FIG. 1 provides output power to the load 118 from an unregulated input VIN 102. The power converter 100 utilizes the energy transfer element T1 104 to transfer energy between the primary 106 and secondary 108 windings. The clamp circuit 112 is coupled to the primary winding 106 of the energy transfer element T1 104 to limit the maximum voltage on the switch S1 110. Switch S1 110 is opened and closed in response to the drive signal 128 received from the controller 122. It is generally understood that a switch that is closed may conduct current and is considered on, while a switch that is open cannot conduct current and is considered off. In the example of FIG. 1, switch S1 110 controls a current ID 130 in response to controller 122 to meet a specified performance of the power converter 100. In some embodiments, the switch S1 110 may be a transistor and the controller 122 may include integrated circuits and/or discrete electrical components. In one embodiment controller 122 and switch S1 110 are included together into a single integrated circuit 125. In one example, the integrated circuit is a monolithic integrated circuit. In another example, the integrated circuit is a hybrid integrated circuit.

The operation of switch S1 110 also produces a time varying voltage VP across the primary winding 106. By transformer action, a scaled replica of the voltage VP is produced across the secondary winding 108, the scale factor being the ratio that is the number of turns NS of secondary winding 108 divided by the number of turns NP of primary winding 106. The switching of switch S1 110 also produces a pulsating current at the rectifier D1 114. The current in rectifier D1 114 is filtered by output capacitor C1 116 to produce a substantially constant output voltage VO, output current IO, or a combination of the two at the load 118.

The sense circuit 120 senses the output quantity UO to provide the sense signal USENSE 124 to the controller 122. In the example of FIG. 1, the controller 122 also receives the current sense input 126 which relays the sensed switch current ID 130 in the switch S1 110. The switch current ID 130 may be sensed in a variety of ways, such as for example the voltage across a discrete resistor or the voltage across the transistor when the transistor is conducting.

The controller 122 outputs drive signal 128 to operate the switch S1 110 in response to various system inputs to substantially regulate the output quantity UO to the desired value. With the use of the sense circuit 120 and the controller 122, the output of the switched mode power converter 100 is regulated in a closed loop. Controller 122 further includes multi-stage sampling circuit 132 to receive and store the output quantity UO provided by sense signal USENSE 124. The stored output quantity UO is then outputted to drive logic 134. The multi-stage sampling circuit 132 provides a way to quickly store the output quantity UO and hold the output quantity UO for several clock cycles without using fast, expensive buffers.

Figure 2:
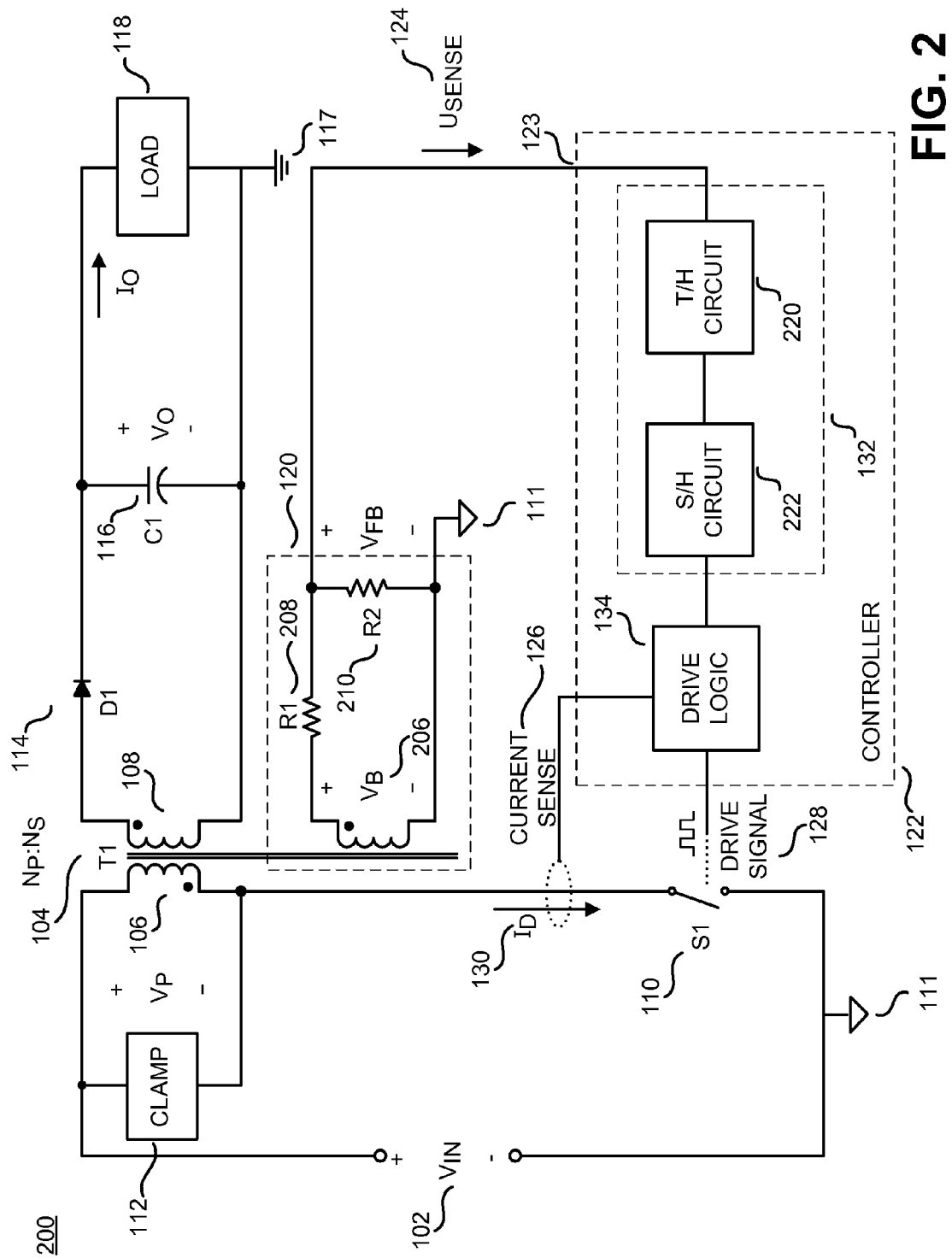
FIG. 2 is a functional block diagram illustrating an example power converter having a sense circuit that includes a primary-referenced winding, in accordance with the teachings of the present invention.

FIG. 2 is a functional block diagram illustrating an example power converter 200 having a sense circuit 120 that includes a primary-referenced winding (e.g., bias winding 206), in accordance with the teachings of the present invention. Power converter 200 is one possible implementation of power converter 100 and provides further details as to a possible sense circuit 120 and multi-stage sampling circuit 132. In FIG. 2, example sense circuit 120 is illustrated as including bias winding 206 and resistors R1 208 and R2 210. Bias winding 206 may be an additional winding of energy transfer element T1 104. The illustrated example of multi-stage sampling circuit 132 is shown in FIG. 2 as including a track and hold circuit 220 and a sample and hold circuit 222.

In the illustrated embodiment, sense circuit 120 provides the sense signal USENSE 124. Resistors R1 208 and R2 210 are coupled across the bias winding 206. Bias winding 206 and resistor R2 210 are coupled to input return 111. In the example shown, the voltage across resistor R2 210 (feedback voltage VFB) is utilized as the sense signal USENSE 124. The feedback voltage VFB is received by the controller 122 at terminal 123 and further, the multi-stage sampling circuit 132.

In operation, the bias winding 206 produces a voltage VB that is responsive to the output voltage VO when rectifier D1 114 on secondary winding 108 conducts. Feedback voltage VB and sense signal USENSE 124 are representative of the output voltage VO during at least a portion of an OFF time of switch S1 110. In one embodiment, sense signal USENSE 124 is representative of the output voltage VO only during the portion of the OFF time. During the on-time of the switch S1 110, the bias winding 206 produces a voltage VB that is response to the input voltage VIN 102. In another example, bias winding 210 may also provide a source of power to the circuits within controller 122. Resistors R1 208 and R2 210 are utilized to scale down the voltage of the bias winding 206. As such, feedback voltage VFB is a scaled version of the bias voltage VB.

It is appreciated that many variations are possible in the use of a bias winding to sense an output voltage VO and for providing sensing while also providing power to a controller with galvanic isolation. For example, a bias winding may apply a rectifier and a capacitor similar to rectifier D1 114 and capacitor C1 116, respectively, to produce a dc bias voltage while providing an ac feedback signal from the anode of the rectifier. As such, additional passive components such as resistors may be used on the bias winding to scale the voltage from the winding to a value that is more suitable to be received by controller 122.

Use of bias winding 206 to sense output voltage VO provides galvanic isolation between the output voltage VO and the controller 122 without the expense of an optocoupler. However, when using a winding of energy transfer element 104 to sense output voltage VO, the voltage VB at bias winding 206 is representative of output voltage VO only when output rectifier D1 114 is conducting. In other words, the sense circuit 120 may only sense the output voltage VO during the off-time of the switch S1 110. However, when the switching frequency of the switch S1 110 is high (corresponding to shorter switching periods), there is less time to sense the output of the power converter. As will be further shown, the voltage VB is representative of the output voltage VO and then falls to zero during the off time of a switching cycle. The lighter the load, the quicker the output voltage VO falls to zero during the off-time. As such, there is also less time to sense the output voltage VO of the power converter 200. Embodiments of the present invention utilize a multi-stage sampling circuit 132 to quickly acquire the value of the sense signal USENSE 124 (i.e. feedback voltage VFB) at the latest possible time, without the need of fast, high current buffers, while holding the feedback voltage VFB on a large capacitor over many switching cycles. As will be further discussed, the feedback voltage VFB is tracked by track and hold circuit 220 and the value of the feedback voltage VFB is quickly held on a small capacitor. Once the value is held, the value of the feedback voltage VFB is transferred, through sample and hold circuit 222, to a larger capacitor which may hold the value for many switching cycles and clock cycles, without concern for the state of the actual feedback voltage VFB.

Figure 3:
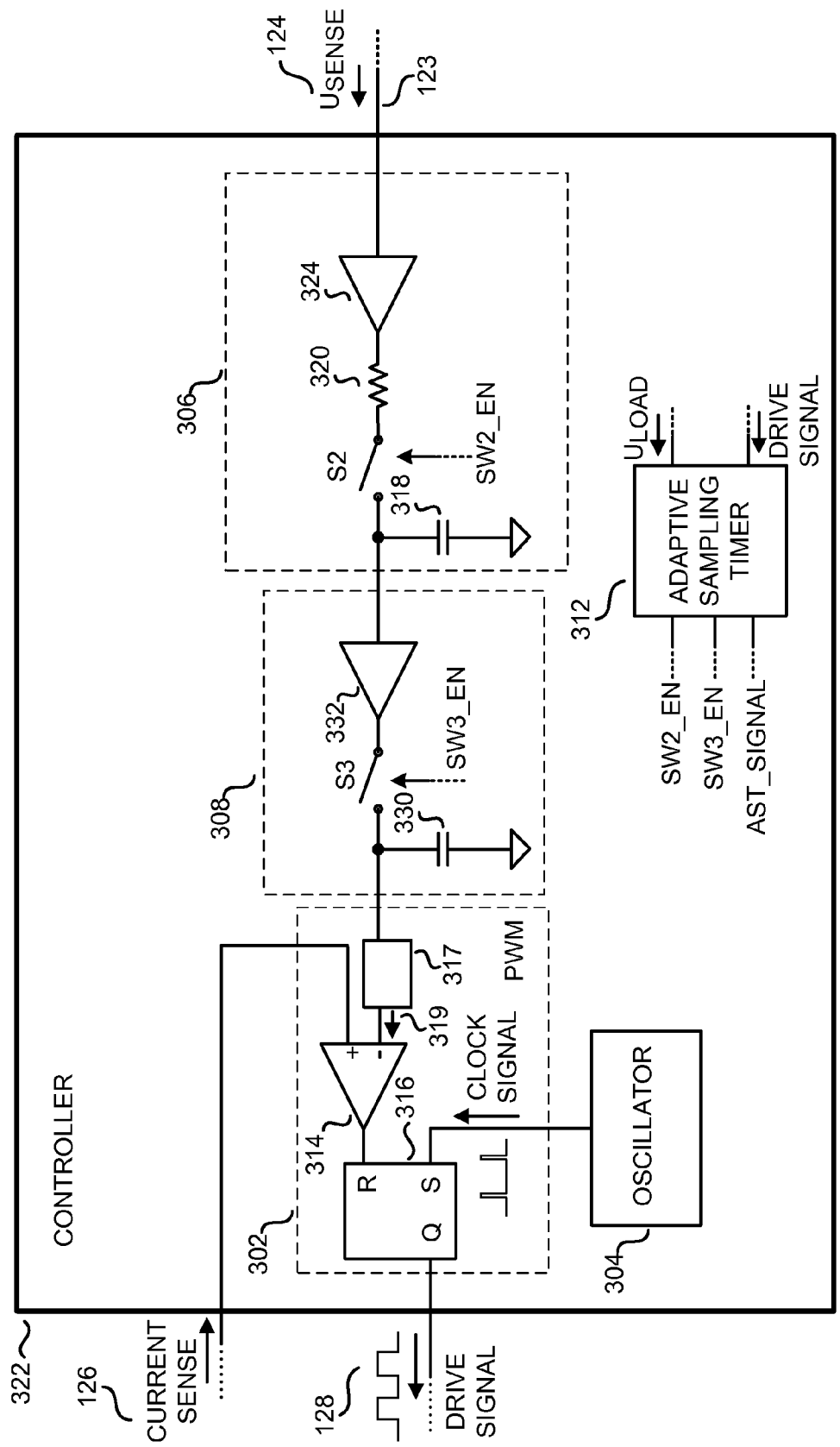
FIG. 3 is a functional block diagram illustrating an example controller, in accordance with the teachings of the present invention.

FIG. 3 is a functional block diagram illustrating an example controller 322, in accordance with the teachings of the present invention. Controller 322 is one possible implementation of controller 122 shown in FIGS. 1 and 2. The illustrated example of controller 322 includes terminal 123, drive logic (e.g., pulse-width modulation (PWM) circuit 302), an oscillator 304, a track and hold circuit 306, a sample and hold circuit 308, and an adaptive sampling timer 312. PWM circuit 302 is shown as including a latch 316, a current limit generator 317, and a comparator 314. Track and hold circuit 306 is shown as including a track and hold capacitor 318, a track and hold switch S2, a resistor 320, and a buffer 324. Sample and hold circuit 308 is illustrated as including a sample and hold capacitor 330, a sample and hold switch S3, and a buffer 332.

As shown in FIG. 3, track and hold circuit 306 is coupled to terminal 123 to receive sense signal USENSE 124. Within track and hold circuit 306, buffer 324 is coupled to receive sense signal UFB 124 from terminal 123. Buffer 324 is further coupled to the resistor 320 while the resistor 320 is coupled to switch S2. Switch S2 is coupled to control whether track and hold circuit 306 is tracking or holding the value that is output from buffer 324 in response to the enable signal SW2_EN. For example, when switch S2 is enabled (i.e., closed), the voltage across capacitor 318 tracks the output of buffer 324. Similarly, when switch S2 is disabled (i.e., open), the voltage across capacitor 318 is held.

In the illustrated example of FIG. 3, sample and hold circuit 308 is coupled to the output of track and hold circuit 306. Buffer 332 is coupled to receive the output of track and hold circuit 306 and is further coupled to the switch S3. The switch S3 is further coupled to sample and hold capacitor 330 and is coupled to control whether sample and hold circuit 308 is sampling or holding the value that is output from buffer 332 in response to the enable signal SW3_EN. For example, when switch S3 is enabled (i.e., closed), the voltage across capacitor 330 integrates the output of buffer 332 over a sample period. Similarly, when switch S3 is disabled (i.e., open) at the end of the sample period, the voltage across capacitor 330 is held. In one embodiment, the capacitance value of capacitor 330 is much larger than the capacitance value of capacitor 318. For example, capacitor 330 may have a capacitance value that is approximately 10 times that of capacitor 318. In one embodiment, capacitor 318 is small enough to quickly track and acquire the sense signal USENSE 124, while capacitor 318 is large enough to store and maintain the value of sense signal USENSE 124 (in one embodiment the feedback voltage VFB shown in FIG. 2) for many clock cycles of the switch S1 110. By way of example, capacitor 318 may be approximately 5 pF and capacitor 330 may be approximately 50 pF. The value of capacitor 330 may depend on the process leakage at high temperature and the specifications for regulation of the output.

Coupled to the output of sample and hold circuit 308 is PWM circuit 302. PWM circuit 302 generates the drive signal 128 to control switch S1 110 to regulate the output of the power converter in response to the output of the sample and hold circuit (i.e., the voltage held on capacitor 330) and also in response to the current sense signal 126. In particular, current limit generator 317 is coupled to capacitor 330 and outputs a variable current limit threshold 319 in response to the value held on capacitor 330. In one embodiment, current limit generator 317 includes an error amplifier (not shown) to amplify a difference between the sampled output voltage, as indicated by the value held on capacitor 330, and a reference value. The output of the error amplifier may then be converted into a current limit threshold that is representative of a load condition at the output of the power converter. For example, a high current limit threshold may represent a heavy load condition, whereas a low current limit threshold may represent a light load condition at the output.

Comparator 314 is coupled to compare the current sense signal 126 with the variable current limit threshold 319 and to disable switch S1 110 (see FIG. 2). Comparator 314 is coupled to the reset-input of latch 316 and the latch 316 is reset when the current sense signal 126 exceeds the current limit threshold 319. Latch 316 is also coupled to enable the switch S1 110 each switching period by way of the clock signal received at the set-input of latch 316. In one embodiment, the frequency of oscillator 304 is also the switching frequency of switch S1 110. However, that is not necessarily true during light load operation. In one embodiment, oscillator 304 generates the clock signal having a fixed frequency such that the switching period T of each switching cycle is fixed. During light load conditions, the power switch S1 110 is not enabled at every clock cycle and the effective switching frequency is lower than the clock frequency. As such, the capacitor 330 should be large enough to hold the value of the sensed signal for several clock cycles until at least the next switching event.

As shown in FIG. 3, controller 322 also includes adaptive sampling timer 312. Adaptive sampling timer 312 is adapted to generate the adaptive sampling timer signal AST_SIGNAL which may be utilized to generate multiple timing signals to control the operation of track and hold circuit 306 and sample and hold circuit 308. For example, the illustrated example of adaptive sample timer 312 is coupled to provide the adaptive sampling timer signal AST_SIGNAL which is utilized to generate the enable signal SW2_EN and enable signal SW3_EN. As mentioned above, the sense signal USENSE 124 may be representative of the output voltage only during a portion of the time that power switch S1 is OFF. Accordingly, adaptive sampling timer 312 may generate the adaptive sampling timer signal AST_SIGNAL such that the length of the logic high sections of adaptive sampling timer signal AST_SIGNAL are representative of when the sense signal USENSE 124 provides information regarding the output voltage. Thus, the adaptive sampling timer 312 controls the track and hold circuit 306 such that the capacitor 318 is tracking the sense signal USENSE 124 only during this portion of time (i.e., the portion of time when switch S1 is off that the sense signal USENSE 124 is representative of the output voltage). This portion of time may be referred to herein as the adaptive sampling time (e.g., when the AST_SIGNAL is logic high). Thus, the adaptive sampling time is at least a portion of time that the sense signal USENSE 124 may be representative of the output voltage.

In one embodiment, the adaptive sampling timer signal AST_SIGNAL pulses to a logic high value based on the drive signal. For the example shown in FIG. 2, the sense signal USENSE 124 is representative of the output voltage VO during the off-time. As such, the adaptive sampling timer signal AST_SIGNAL pulses to the logic high value during the off-time of the switch S1 110. The length of the logic high section (i.e., adaptive sampling time) may be based on the load conditions. Furthermore, the adaptive sampling timer 312 may generate the adaptive sampling timer signal AST_SIGNAL such that the switch S2 is on (i.e. closed) a fixed delay time (e.g., 0.22 µs) after the power switch S1 110 turns off to allow for ringing of the sense signal USENSE 124 that may occur immediately after the power switch S1 turns off to subside.

Furthermore, the amount of time that the sense signal USENSE 124 is representative of the output voltage may vary (e.g., between 1.2-2.5 µs) as a function of load conditions at the output of the power converter. For example, for light-load conditions the amount of time that the sense signal USENSE 124 is representative of the output voltage is less than it is for heavy-load conditions. Accordingly, adaptive sampling timer 312 is coupled to generate the adaptive sampling timer signal AST_SIGNAL in response to a load condition signal ULOAD that is representative of the load condition at the output of the power converter. Thus, in one embodiment, adaptive sampling timer 312 generates the adaptive sampling timer signal AST_SIGNAL such that the adaptive sampling time (e.g., time that switch S2 is closed) varies (e.g., between 1.2-2.5 μs) as a function of the load condition at the output of the power converter.

In one embodiment, each of the timing signals SW2_EN and SW3_EN pulse for a fixed time period in response to the adaptive sampling timer signal AST_SIGNAL. Although not shown, monostable multivibrators may be utilized to generate the enable signals SW2_EN and SW3_EN. Further, the enable signals SW2_EN and SW3_EN pulse in response to the end of the adaptive sampling time. In one example, the enable signal SW2_EN falls to a logic low value at the end of the adaptive sampling time. In addition, enable signal SW3_EN pulses to a logic high vale at the end of the adaptive sampling time. Thus, the time at which track and hold circuit 306 holds the value on capacitor 318 and the time at which sample and hold circuit 308 samples are also responsive to load conditions at the output of the power converter.

As mentioned above, the variable current limit threshold 319 is representative of the load condition at the output of the power converter. Thus, in one embodiment adaptive sampling timer 312 is coupled to receive the output of current limit threshold generator 317 and the load condition signal ULOAD is the variable current limit threshold 319. In another embodiment, the error voltage (output of the error amplifier in current limit generator 317) may be utilized as the load signal ULOAD to determine the load conditions. In these examples, adaptive sampling timer 312 generates the adaptive sampling timer signal AST_SIGNAL in response to the power switch S1 110 turning off. In one example, as the adaptive sampling timer signal AST_SIGNAL pulses to a logic high value, adaptive sampling timer 312 begins by charging a capacitor (included in adaptive sampling timer 312) in response to the switch S1 110 turning off. The current that is used to charge the capacitor is the difference between a fixed current source and a current representative of the current limit threshold. Once the voltage on the capacitor increases to a reference voltage, the adaptive sampling timer 312 transitions the adaptive sampling timer signal AST_SIGNAL back to a logic low value. Thus, as the current limit threshold decreases, the current used to charge the capacitor included in the adaptive sampling timer 312 increases. As such, the time it takes the capacitor to charge and the adaptive sampling time decreases for light-load conditions. Adaptive sampling timer 312 may further include one or more monostable multivibrators (e.g., one-shots) that are triggered by the adaptive sampling timer signal AST_SIGNAL to generate timing signals SW2_EN and SW3_EN.

Figure 4:
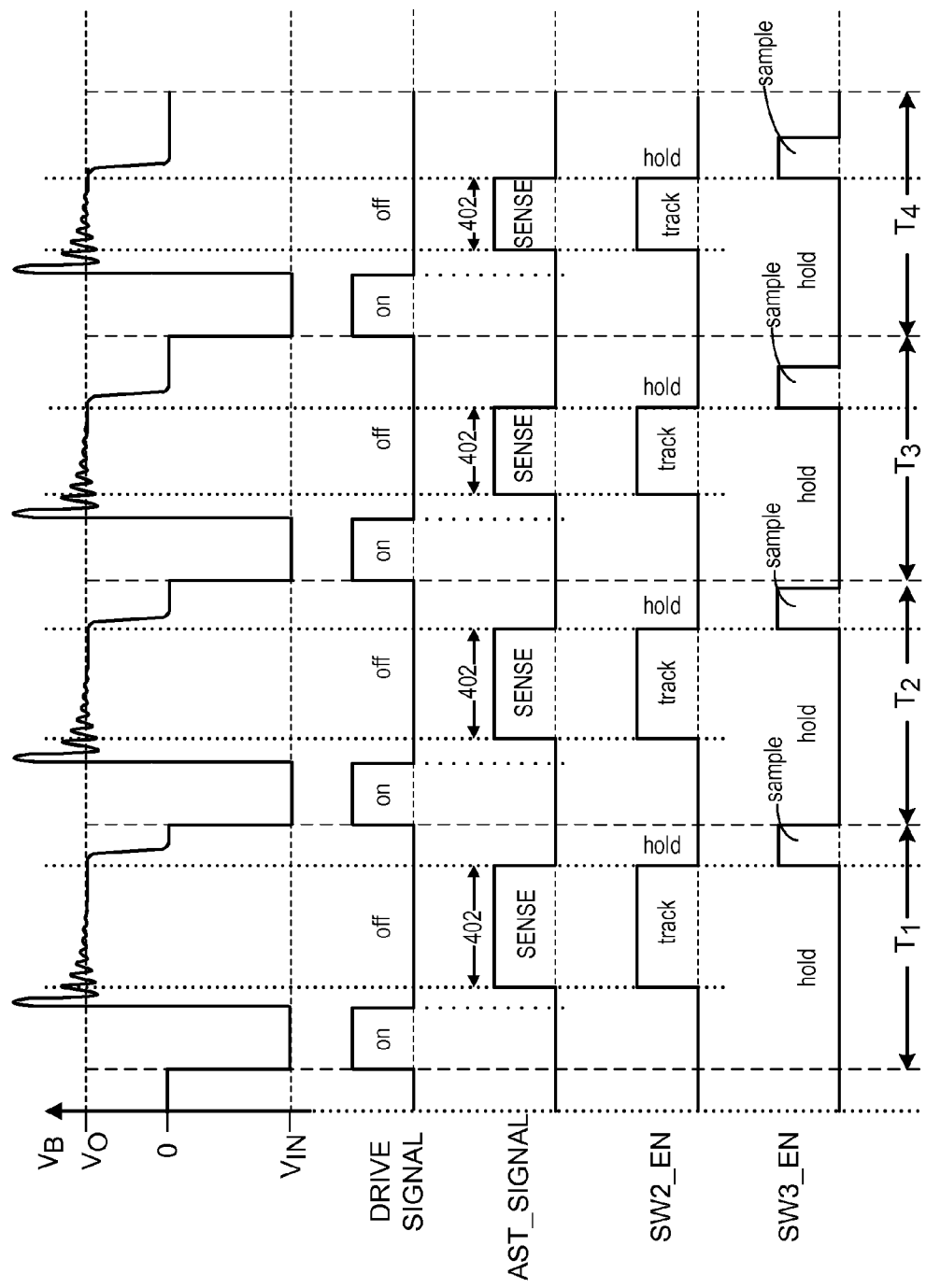
FIG. 4 illustrates example voltage and current waveforms and clock signals associated with an example multi-stage sampling circuit in accordance with the teachings of the present invention.

FIG. 4 illustrates example voltage and current waveforms and clock signals associated with an example multi-stage sampling circuit, such as is included in controller 322 of FIG. 3, in accordance with the teachings of the present invention. The waveforms and clock signals of FIG. 4 are described with further references to FIGS. 1-3.

The bias winding voltage VB and drive signal waveforms are illustrated at the top of FIG. 4. As shown in FIG. 4, the bias winding voltage VB (and thus the feedback voltage VFB) is representative of the line input voltage VIN during the on-time of switch S1 (e.g., when drive signal is HIGH), and is representative of the output voltage VO during the off-time of switch S1 (e.g., when drive signal is LOW). At the beginning of switching cycle T1, the AST_SIGNAL is LOW. Additionally, the enable signal SW2_EN is LOW and capacitor 318 is not tracking sense signal USENSE 124. At the beginning of the switching cycle T1, the sense signal USENSE 124 is representative of the input voltage VIN via the bias winding voltage VB.

As shown in FIG. 4, there is ringing in the bias winding voltage when the switch first turns off. Thus, adaptive sampling timer 312 may delay asserting the AST_SIGNAL to allow the ringing to first subside. In one embodiment, this delay before asserting the AST_SIGNAL and enable signal SW2_EN is a fixed delay. Once the AST_SIGNAL is asserted (i.e., transitions to a logic HIGH), the enable signal SW2_EN transitions to a logic high value and capacitor 318 begins tracking the sense signal USENSE 124 which is now representative of the output voltage via feedback voltage VFB.

The amount of time before the bias winding voltage VB drops to zero is due to load conditions at the output of the power converter. Thus, the amount of time that bias winding voltage VB is representative of the output voltage VO is also dependent on the load conditions. For example, the lighter the load, the shorter the time that bias winding VB is representative of the output voltage. Accordingly, the adaptive sampling timer 312 provides adaptive sampling times 402 that are responsive to these load conditions to allow valid feedback information to be provided to the multi-stage sampling circuit 132.

At the end of the adaptive sampling time 402, the AST_SIGNAL is transitioned to a logic LOW. Also at the end of the adaptive sampling time 402, enable signal SW2_EN switches to a logic LOW to hold the value on track and hold capacitor 318. Switch S2 is opened (i.e., disabled) at the end of the adaptive sampling time 402, in part, to ensure a more accurate representation of the output voltage is held on track and hold capacitor 318 due to the fact that the ringing in the sense signal USENSE 124 has subsided at this time.

At the end of the adaptive sampling time 402, enable signal SW3_EN transitions to a logic high value. When SW3_EN transitions to a logic high value to enable switch S3, capacitor 330 begins sampling the value held on the track and hold capacitor 318. Capacitor 330 integrates the value held on track and hold capacitor 318 over a sample period (i.e., the time that SW3_EN signal is HIGH. In one embodiment, the time that SW3_EN signal is HIGH is a fixed period. At the end of the sample period of sample and hold circuit 308, the value held on track and hold capacitor 318 is now held on capacitor 330 for use by drive logic 302 in the regulation of the output of the power converter. Over time, a capacitor will discharge and lose the value (i.e. voltage) stored on the capacitor. A larger capacitor will hold its value longer than a smaller capacitor. As discussed above, the capacitance value of capacitor 330 is large (e.g., 50 pF), such that the sample held on capacitor 330 is valid for several clock cycles. Thus, drive logic 302 may continue to get valid feedback information even in the absence of switching. Also, as shown in FIG. 4, the sampling by sample and hold circuit 308 may occur even after the bias winding voltage VB, and thus the sense signal USENSE 124, are no longer representative of the output voltage.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. An integrated circuit controller for a power converter, the controller comprising:
    a track and hold circuit to be coupled to receive a signal from a single terminal of the controller, the signal to represent an output voltage of the power converter during at least a portion of an off time of a first switch, wherein the track and hold circuit includes a first capacitor coupled to provide a first voltage that tracks the signal during the portion of the off time of the first switch and holds the first voltage at an end of the portion of the off time;
    a sample and hold circuit coupled to the track and hold circuit to sample the first voltage when the first voltage is held on the first capacitor, wherein the sample and hold circuit includes a second capacitor coupled to integrate an output of the first capacitor over a sample period that ends before a next on time of the first switch and to hold a second voltage representative of the first voltage after the sample period, wherein the second capacitor has a capacitance value larger than that of the first capacitor; and
    drive logic coupled to the sample and hold circuit and coupled to control the first switch to regulate an output of the power converter in response to the second voltage, wherein the drive logic includes:
        a current limit generator coupled to the second capacitor to generate a variable current limit threshold in response to the second voltage; and
        a comparator coupled to disable the first switch during the on time of the first switch in response to comparing a current sense signal that is representative of a switch current in the first switch with the variable current limit threshold.

2. The controller of claim 1, wherein the signal received from the single terminal is not representative of the output voltage of the power converter when the sample and hold circuit samples the first voltage held on the first capacitor.

3. The controller of claim 1, wherein the track and hold circuit further comprises a track and hold switch coupled to the first capacitor, wherein the first voltage tracks when the track and hold switch is enabled and holds when the track and hold switch is disabled.

4. The controller of claim 3, further comprising an adaptive sampling timer coupled to the track and hold circuit to control the track and hold switch.

5. The controller of claim 4, wherein the adaptive sampling timer is adapted to disable the track and hold switch to hold the first voltage on the first capacitor in response to a load condition at the output of the power converter.

6. The controller of claim 4, wherein the sample and hold circuit further comprises a sample and hold switch coupled to the second capacitor, wherein the sample period begins when the sample and hold switch is enabled and the second voltage is held on the second capacitor when the sample and hold switch is disabled.

7. The controller of claim 1, wherein the first switch is included in the integrated circuit controller.

8. A power converter, comprising:
    an energy transfer element;
    a first switch coupled to the energy transfer element to control a transfer of energy through the energy transfer element; and
    a controller coupled to the first switch, the controller comprising:
        a track and hold circuit to be coupled to receive a signal from a single terminal of the controller, the signal to represent an output voltage of the power converter during at least a portion of an off time of the first switch, wherein the track and hold circuit includes a first capacitor coupled to provide a first voltage that tracks the signal during the portion of the off time of the first switch and holds the first voltage at an end of the portion of the off time;
        a sample and hold circuit coupled to the track and hold circuit to sample the first voltage when the first voltage is held on the first capacitor, wherein the sample and hold circuit includes a second capacitor coupled to integrate an output of the first capacitor over a sample period that ends before a next on time of the first switch and to hold a second voltage representative of the first voltage after the sample period, wherein the second capacitor has a capacitance value larger than that of the first capacitor; and
        drive logic coupled to the sample and hold circuit and coupled to control the first switch to regulate an output of the power converter in response to the second voltage, wherein the drive logic includes:
            a current limit generator coupled to the second capacitor to generate a variable current limit threshold in response to the second voltage; and;
            a comparator coupled to disable the first switch during the on time of the first switch in response to comparing a current sense signal that is representative of a switch current in the first switch with a variable current limit threshold.

9. The power converter of claim 8, wherein the signal received from the single terminal is not representative of the output voltage of the power converter when the sample and hold circuit samples the first voltage held on the first capacitor.

10. The power converter of claim 8, wherein the track and hold circuit further comprises a track and hold switch coupled to the first capacitor, wherein the first voltage tracks when the track and hold switch is enabled and holds when the track and hold switch is disabled.

11. The power converter of claim 10, wherein the controller further comprises an adaptive sampling timer coupled to the track and hold circuit to control the track and hold switch.

12. The power converter of claim 11, wherein the adaptive sampling timer is adapted to disable the track and hold switch to hold the first voltage on the first capacitor in response to a load condition at the output of the power converter.

13. The power converter of claim 11, wherein the sample and hold circuit further comprises a sample and hold switch coupled to the second capacitor, wherein the sample period begins when the sample and hold switch is enabled and the second voltage is held on the second capacitor when the sample and hold switch is disabled.

14. The power converter of claim 8, further comprising a sense circuit coupled to provide the signal to the controller, the sense circuit including a primary-referenced winding of the energy transfer element, wherein a voltage across the primary-referenced winding is representative of the output voltage during at least the portion of the off time of the first switch and is representative of a line input voltage of the power converter during at least a portion of an on time of the first switch.

15. The power converter of claim 8, wherein the controller and the first switch are included in a single integrated circuit.

16. The controller of claim 1, wherein the sample period is a fixed time period.

17. The controller of claim 5, wherein the adaptive sampling timer is coupled to receive a load condition signal that is representative of the load condition at the output of the power converter, wherein the load condition signal is responsive to the variable current limit threshold generated by the current limit generator.

18. The power converter of claim 8, wherein the sample period is a fixed time period.

19. The power converter of claim 12, wherein the adaptive sampling timer is coupled to receive a load condition signal that is representative of the load condition at the output of the power converter, wherein the load condition signal is responsive to the variable current limit threshold generated by the current limit generator.

\* \* \* \* \*